(12) United States Patent
Romijn et al.

(10) Patent No.: US 8,435,368 B2
(45) Date of Patent: May 7, 2013

(54) DEVICE FOR ULTRASONIC WELDING OF AT LEAST TWO PLASTIC FOIL LAYERS

(75) Inventors: Barend Bastiaan Romijn, Weert (NL); Ivan Jacobus Janssen, Roermond (NL); Hannes Köhler, Dresden (DE)

(73) Assignee: Robert Bosch Packaging Technology B.V. (NL)

( * ) Notice: Subject to any disclaimer, the term of this patent is extended or adjusted under 35 U.S.C. 154(b) by 0 days.

(21) Appl. No.: 12/899,318

(22) Filed: Oct. 6, 2010

(65) Prior Publication Data
US 2011/0079342 A1 Apr. 7, 2011

(30) Foreign Application Priority Data
Oct. 7, 2009 (NL) ...................................... 1037376

(51) Int. Cl.
*B32B 37/00* (2006.01)
(52) U.S. Cl.
USPC ...................................... 156/73.1; 156/580.2
(58) Field of Classification Search .................. 156/73.1, 156/580, 580.1, 580.2, 581, 583.1
See application file for complete search history.

(56) References Cited

U.S. PATENT DOCUMENTS

| | | | |
|---|---|---|---|
| 378,201 A | 2/1963 | Howard | |
| 3,681,176 A | 8/1972 | Reifenhauser et al. | |
| 4,159,220 A | 6/1979 | Bosche et al. | |
| 6,089,438 A * | 7/2000 | Suzuki et al. | 228/1.1 |
| 7,954,536 B2 * | 6/2011 | Brewer et al. | 156/583.1 |

FOREIGN PATENT DOCUMENTS

| | | |
|---|---|---|
| DE | 17 79 534 A1 | 11/1971 |
| EP | 0730946 A2 | 9/1996 |
| EP | 1 241 100 A1 | 9/2002 |
| FR | 2 829 963 A1 | 3/2003 |
| JP | 63 106440 U | 7/1988 |
| JP | 10 291081 A | 11/1998 |
| NL | 7 700 745 A A | 8/1977 |

OTHER PUBLICATIONS

International Search Report for priority application NL 1037376.
European Search Report for corresponding European Application No. EP 10 18 6410 having a mailing date of Dec. 20, 2010.

* cited by examiner

*Primary Examiner* — James Sells
(74) *Attorney, Agent, or Firm* — Wood, Phillips, Katz, Clark & Mortimer

(57) ABSTRACT

The invention relates to a device for ultrasonic welding of at least two plastic foil layers for manufacturing for example a package. The device comprises at least one sonotrode and at least one anvil positioned opposite each other and each being provided with a pressure surface. The pressure surfaces can be moved away from each other and towards each other from a position of rest to a welding position and vice versa, the pressure surfaces in the welding position forming a welding section as well as a flow-out section. The pressure surfaces in the flow-out section have at least two pressure surface areas extending substantially parallel to each other for supporting the foil layers.

6 Claims, 4 Drawing Sheets

DEVICE FOR ULTRASONIC WELDING OF AT LEAST TWO PLASTIC FOIL LAYERS

The invention relates to a device for ultrasonic welding of at least two plastic foil layers for manufacturing a package, for example, which device comprises at least one sonotrode and at least one anvil positioned opposite each other and which are each provided with a pressure surface, which pressure surfaces can be moved away from each other and towards each other from a position of rest to a welding position and vice versa, the pressure surfaces in the welding position forming at least one welding section as well as at least one flow-out section.

BACKGROUND OF THE INVENTION

Ultrasonic energy is known to be used for welding foil layers of a packaging product such as a bag, for example. To weld the plastic parts of the bag, the material is caused to vibrate under pressure at a high frequency (20 kHz-1 Ghz). As a result, the material structure is deformed so that heat is generated, which heat causes the foil layers to melt. The heat is generated internally in the foil layers to be welded as a result of the friction generated by the vibration in the foil layers.

EP 1.535.723, for example, describes a known device comprising, for example, a sonotrode as well as an anvil, which device is used for ultrasonic welding of foil layers for forming bags.

With the known device, of which a section is diagrammatically shown in the appended FIG. 1, the flow-out section U which ends where at least one of the foil layers to be welded is no longer supported by the anvil, is relatively short compared to the welding section L, which is caused by the shape of the anvil. In operation the liquid plastic generated by means of ultrasonic energy is pressed outwards when the foil layers are welded in the welding section L where the foil layers are pressed together. Due to the shape of the flow-out section the liquid plastic is pressed outwards in an uncontrolled manner, where it cools down and forms a welded joint which is represented in the appended FIG. 1. Depending on the shape accidentally obtained from the liquid plastic it is possible for defective welded joints to be formed side by side with good welded joints as a result of the uncontrolled flowing out of the liquid plastic. The defective welded joints may have weak spots at the beginning and end where the liquid plastic has been able to accumulate in an uncontrolled manner and these weak spots are the result of poor melt fusions which, when loaded, may result in fractures and cracks. These fractures and cracks may be the cause of a part of or even the entire welded joint being ripped open, causing the contents of the bag to be exposed to the atmosphere, which may detrimentally affect the keeping qualities of the products, for example, or may lead to leakages in the case of packaged liquids.

In DE 101.47.565 a device is described for sealing the housings of galvanised elements. The known device comprises a sonotrode and an anvil of which at least one is provided with a raised profile and is surrounded by a planar surface so that ridges can no longer develop on the outside contour of the housings of the galvanic elements. DE 101.47.565 is considered to be the most pertinent prior art of record.

SUMMARY OF THE INVENTION

It is an object of the present invention to provide a device with which reliable welded joints can be formed.

This object is achieved by the device according to the present invention by means of the features defined in the characterizing portion of claim 1.

By means of the two pressure surface areas in the flow-out section extending in parallel with each other the foil layers are supported such that the distance between the foil layers in the flow-out section remains constant, as a result of which the liquid plastic, usually polyethylene (PE) can flow between them in a controlled fashion in a laminar flow and can spread between the two foil layers, while after cooling down a reliable welded joint is realised because the liquid plastic is distributed relatively uniformly at the beginning and/or end of the welded joint. In the welding section the foil layers are pressed together whereas in the flow-out section no pressure on the foil layers is exerted any longer by means of the device. The foil layers are kept together in the flow-out section with a constant gap distance by means of the pressure surface areas. In the flow-out section the hardened plastic forms an important part of the welded joint.

For causing the inclination of the inclined pressure surface areas to be minimised, the two pressure surface areas are provided with inclined face areas so that the angle of inclination of the inclined face areas can be minimised. A minimum angle of inclination of the inclined face areas gradually diminishes the pressure on the compressed foil layers and the molten plastic will gradually flow into the gap between the foil layers. The uniformly shaped gap between the foil layers is realised in the flow-out section by the pressure surface areas extending parallel to each other in the flow-out section and covered by the foil layers. The inclined face areas may have both a constant angle of inclination and a curved angle of inclination with the inclined face areas comprising a radius. Preferably, the angle of inclination of the inclined face area relative to the pressure surface areas extending parallel to each other in the flow-out section is less than 45 degrees.

The invention further relates to a method for forming a package by means of a device described hereinbefore.

Another embodiment of the method according to the present invention is characterised in that in the welding section the distance between the pressure surfaces is smaller than the total foil layer thickness of the foil layers to be welded, while in the flow-out section the distance between the two pressure surface areas running parallel to each other exceeds the total foil layer thickness.

To obtain a proper welded joint in the welding section, the distance between the pressure surface of the sonotrode and the pressure surface of the anvil is to be made smaller, using ultrasonic energy, than the total foil layer thickness of all foil layers to be welded in the welding section. The boundary between the welding section and the flow-out section is formed by the spot where the distance between the pressure surfaces at least equals or is slightly larger than the total foil layer thickness, after which in the flow-out section a uniform space or gap will develop between the foil layers in the pressure surface areas which extend in parallel, in which space or gap molten plastic can be allowed to flow in a controlled manner, can spread evenly and cool down for forming a reliable welded joint. The distance DU between the two pressure surface areas running parallel to each other in the flow-out section is dependent on the number N of foil layers to be welded, where $2 \leq N \leq 8$, with an average foil thickness DF, to be calculated as follows: $N*DF < DU \leq (N+1)*DF$.

A further embodiment of the device according to the present invention is characterised in that a first welding section is surrounded by two flow-out sections, at least one of which two flow-out sections passing into a third flow-out section of a second welding section, the distance between the pressure surfaces in the first welding section being smaller than the distance between the pressure surfaces in the second welding section.

A configuration of the device of this type is for example needed for making a welded joint at a transition between two foil layers and more than two, for example four foil layers. In the first welding section the two foil layers are compressed and welded while liquid plastic will flow into the flow-out section in a laminar fashion, which flow-out section is located on the side of the first welding section directed towards the second welding section. This flow-out section passes into a third flow-out section of the second welding section via a inclined face area. In the second welding section four foil layers, for example, are compressed and welded while liquid plastic will flow into the third flow-out section for example in a laminar fashion. As a result of the connecting flow-out sections, the liquid plastic flowing in a laminar fashion provides that at a transition between two foil layers and more than two foil layers a reliable welded joint is formed, which ensures the proper sealing of the contents of the packaging product.

In the device according to the present invention, at least one of the two flow-out sections belonging to a welding section has two pressure surface areas extending substantially parallel to each other.

BRIEF DESCRIPTION OF THE DRAWINGS

The invention will explained in more detail below on the basis of an embodiment with reference to the appended drawings, in which.

Like parts are indicated by the same numerals in the figures.

DETAILED DESCRIPTION

Figure 1:
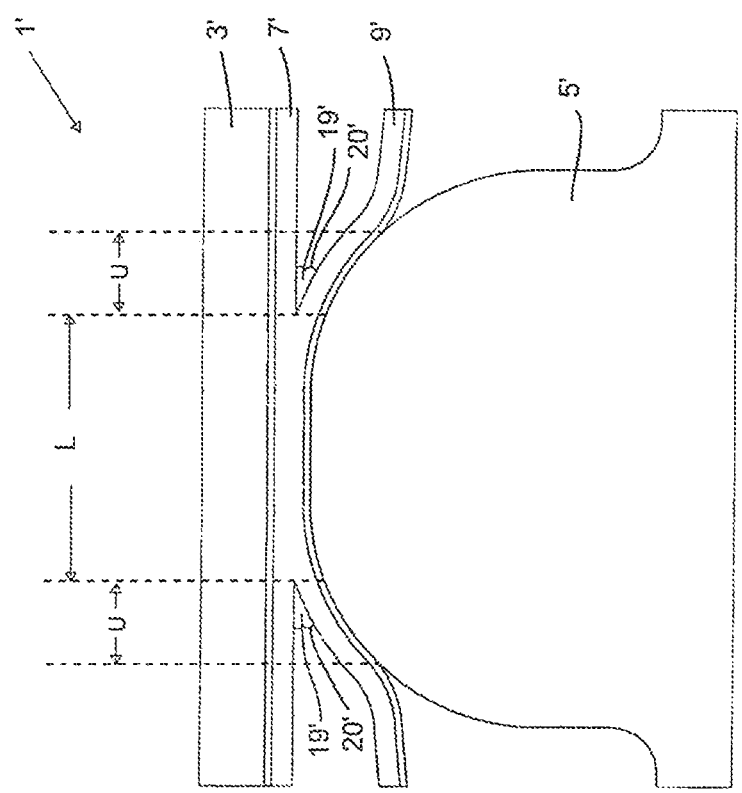
FIG. 1 shows a section of a device according to the prior art.
Figure 2:
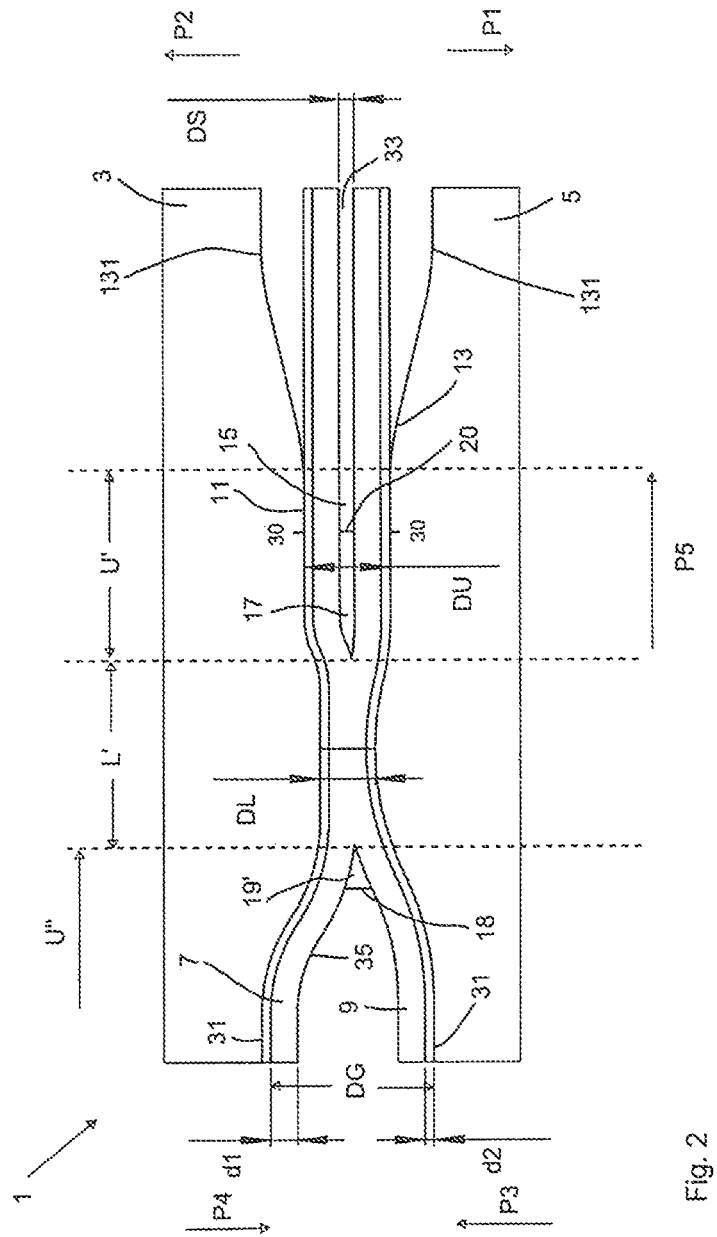
FIG. 2 shows a section of a device according to the invention when two foil layers are being welded.

FIG. 1 shows a device 1' according to the prior art, whilst FIG. 2 shows a device 1 according to the invention. Both devices 1, 1' are equipped with a sonotrode 3, 3' and an anvil 5, 5' of which the longitudinal direction extends transverse to the plane of the paper. In the device 1' according to the prior art there will be a turbulent flow of the liquid plastic in the flow-out section U, as a result of which weak joints will develop in the hardening parts 19' of the welded joint. More particularly, the beginning or end 20' of such welded joints is crucial to the reliability of the welded joint. The welded joint extends between the beginning and the end 20'.

The sonotrode 3, 3' as well as the anvil 5, 5' can be moved away from each other in the directions indicated by the arrows P1, P2 (see FIG. 2) and towards each other in the directions indicated by the arrows P3, P4 from a position of rest to a welding position and vice versa.

In the appended figures the device 1 is only shown in the welding position. From this welding position the sonotrode 3 and the anvil 5 can move to the position of rest in the directions indicated by the arrows P1, P2. In the position of rest of the sonotrode 3 and the anvil 5 the foil layers 7, 9 can move in the direction indicated by the arrow P5 or in the opposite direction.

The sonotrode 3 comprises a single pressure surface 11 that is formed by the sonotrode surface facing the anvil 5, whereas the anvil 5 also comprises a single pressure surface 13 that is formed by the anvil surface facing the sonotrode 3.

In the welding position shown in the figures, two foil layers 7, 9 each having a foil thickness DF, DF=d1+d2, are welded together or joined by means of ultrasonic energy. An advantage of ultrasonic welding compared to welding with heatable tools is that the use of high frequency vibration has the quality of removing any contaminating remainders or contaminations from the surface to be welded, as a result of which the surface to be welded is cleaned simultaneously with the heating operation, which ensures a qualitatively good welded joint between the foil layers 7, 9 to be welded together.

In the welding position the pressure surfaces 11, 13 form at least one welding section L' in which the pressure surfaces are positioned at a minimum distance DL apart as well as at least one flow-out section U' in which pressure surface areas 30 running parallel to each other are positioned at a distance DU from each other. The distance DU in the flow-out section U' between the pressure surface areas 30 of the anvil faces 11, 13 exceeds the distance DL between the pressure surfaces 11, 13 in the welding section L'. In the flow-out section U' the pressure surface areas 30 at least partially extend parallel to each other, on the one hand, for providing a proper support for the foil layers 7, 9 and, on the other hand, for providing a uniform gap 15 between the foil layers 7, 9.

Figure 3:
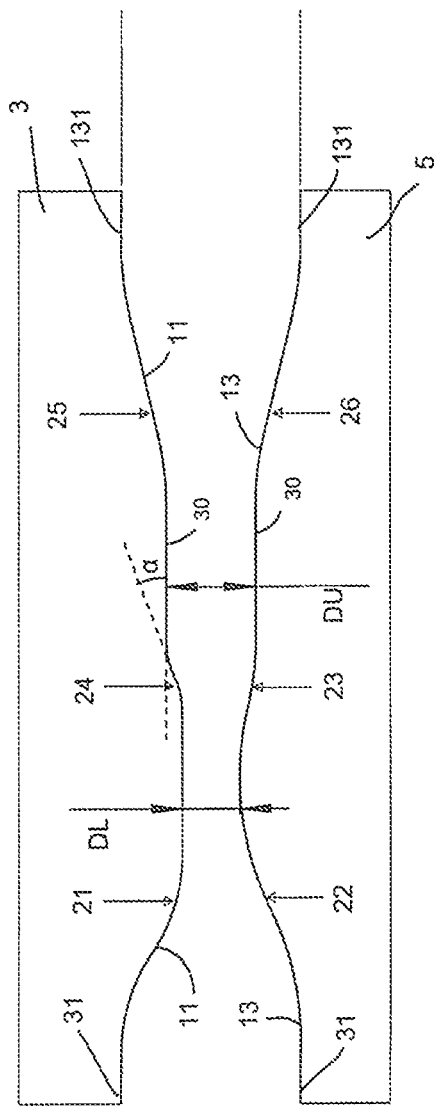
FIG. 3 shows a section of the device as is shown in FIG. 2 where the foil layers are not shown.

In the flow-out section U" located opposite the flow-out section U', with the welding section L' being located in between the flow-out sections U' and U" is shown a less advantageous embodiment for the welding of only two foil layers, since the pressure surface areas 31 extending parallel to each other (of which FIGS. 2 and 3 show only a minor part) of the pressure surfaces are located at a relatively large distance DG in the flow-out section U".

The uniform gap 15 between the foil layers 8, 9 in the flow-out section U' has a constant distance DS. In the gap 15 the liquid plastic (for example PE) that in essence originates from the welding section can uniformly distribute over the foil layers 7, 9 in a laminar fashion, so that after the cooling down a reliable welded joint with a beginning 20 of the flow-out section 17 is obtained in laminar fashion.

The device shown in FIGS. 2 and 3 is suitable for example for manufacturing bags comprising two foil layers 7, 9 on which more stringent demands are placed as regards the beginning 20 of the welded joint that connects the insides 33 (flow-out section U') of the bag than on the end 18 of the welded joint that forms the outsides 35 of the bag (flow-out section U").

Each pressure surface 11, 13 further includes face areas 21, 22, 23, 24, 25, 26 (FIG. 3). By means of the inclined face areas 21-24 the welding section L' passes into the flow-out section U', U". The inclined face areas 25, 26 may introduce a next flow-out section if for example a different number of foil layers (not shown) or foil layers of a different thickness (not shown) were used.

The angles of inclination of the inclined face areas 21-26 relative to the faces extending parallel to each other are smaller than 45 degrees, preferably smaller than 30 degrees. The face areas 21-26 may comprise a constant angle of inclination or a curved angle of inclination while the face areas comprise a radius. Needless to observe that it is possible to utilize a symmetrical profile of the pressure surfaces in lieu of the asymmetrical profile of the pressure surfaces shown in FIGS. 2 and 3. Furthermore it is possible to provide mirror-symmetrical flow-out sections on either one of the two sides of the welding section. At transitions between two foil layers to be welded and for example four foil layers to be welded the profile of the pressure surfaces has different welding sections and flow-out sections. A first welding section is then for example optimized for welding two foil layers and a second welding section is then optimized for welding four foil layers. In the consecutive flow-out sections of the first and the second welding section a highly reliable welded joint is realized at such a transition from two to for example four foil layers as a result of the laminar flow of the plastic generated by the flow-out sections.

Figure 4:
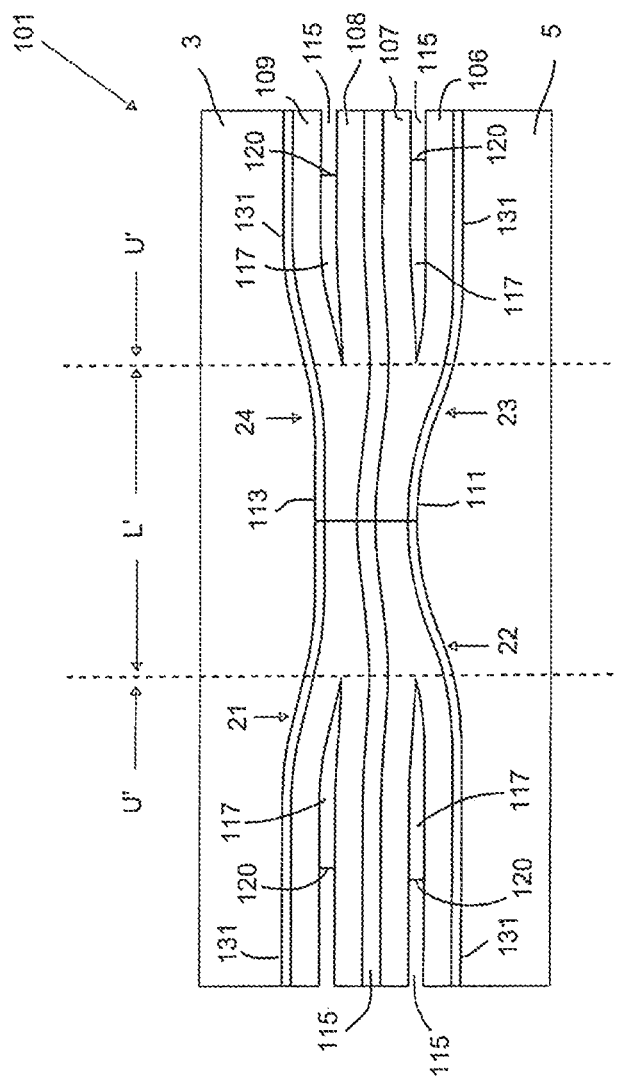
FIG. 4 shows a section of the device according to the invention when four foil layers are being welded.

FIG. 4 shows a device 101 according to the present invention, which may be a separate device but may also form part of the device 1 shown in FIGS. 2 and 3, in which on both sides of the welding section L' flow-out sections embodied according to the invention are located. The device shown in FIG. 4 is quite suitable for manufacturing reliable welded joints 117 in four foil layers 106, 107, 108, 109 as well as reliable beginnings and ends 120 of these welded joints. The pressure surface areas 131 of the pressure surfaces 111, 113 extend parallel to each other in the flow-out sections U' as a result of which gaps 115 between the foil layers 106, 107, 108, 109 are obtained in which the molten plastic can be allowed to flow and can thus spread out in optimum fashion for providing a reliable welded joint. In a system for manufacturing bags the device 1 shown in FIG. 2 is preferably combined with the device 101 for manufacturing bags shown in FIG. 4. The areas 131 of the pressure surfaces 11, 13 shown in FIGS. 2 and 3 may be followed by the profile shown in FIG. 4. Such consecutive welding sections are suitable for manufacturing the welded joints already mentioned above in transition zones between two and for example four foil layers.

What is claimed is:

1. A device (1) for ultrasonic welding of at least two plastic foil layers (7, 9) for manufacturing a package, which device comprises at least one sonotrode (3) and at least one anvil (5) positioned opposite each other and which are each provided with a pressure surface (11, 13), which pressure surfaces can be moved away from each other and towards each other from a position of rest to a welding position and vice versa, the pressure surfaces in the welding position forming at least one welding section (L') as well as at least one first and a second flow-out section (U', U") between which the welding section is located, at least one of the pressure surfaces in the welding section being of a convex shape for directing the ultrasonic energy, the pressure surfaces in the flow-out sections being provided with at least two pressure surface areas (30, 31) in essence extending parallel to each other for supporting the foil layers, characterised in that both the anvil and the sonotrode have inclined face areas between the welding section and the flow-out section by means of which inclined face areas the welding section passes into the flow-out section; characterised in that the two pressure surface areas (30) in essence extending parallel to each other in the first flow-out section for forming the inside of the package are closer together than the two pressure surface areas (31) in essence extending parallel to each other in the second flow-out section for forming the outside of the package.

2. A device according to claim 1, characterised in that the angle of inclination of the inclined pressure surface areas relative to the pressure surface areas of the flow-out section extending parallel to each other is smaller than 45 degrees.

3. A device (1) for ultrasonic welding of at least two plastic foil layers (7, 9) for manufacturing a package, which device comprises at least one sonotrode (3) and at least one anvil (5) positioned opposite each other and which are each provided with a pressure surface (11, 13), which pressure surfaces can be moved away from each other and towards each other from a position of rest to a welding position and vice versa, the pressure surfaces in the welding position forming at least one welding section (L') as well as at least one first and a second flow-out section (U', U") between which the welding section is located, at least one of the pressure surfaces in the welding section being of a convex shape for directing the ultrasonic energy, the pressure surfaces in the flow-out sections being provided with at least two pressure surface areas (30, 31) in essence extending parallel to each other for supporting the foil layers, characterised in that both the anvil and the sonotrode have inclined face areas between the welding section and the flow-out section by means of which inclined face areas the welding section passes into the flow-out section;
characterised in that a first welding section is surrounded by two flow-out sections, at least one of which flow-out sections passing into a third flow-out section of a second welding section, while the distance between the pressure surfaces in the first welding section is smaller than the distance between the pressure surfaces in the second welding section.

4. A method for ultrasonic welding of at least two plastic foil layers for manufacturing a package by means of a device according to claim 1.

5. A method according to claim 4, characterised in that in the welding section the distance between the pressure surfaces is smaller than the total foil layer thickness of the foil layers to be welded, while the distance between the two pressure surface areas running parallel to each other in the flow-out section exceeds the total foil layer thickness.

6. A method according to claim 4, characterised in that the distance DU between the two pressure surface areas running parallel to each other in the flow-out section is dependent on the number N of foil layers to be welded, where $2 \leq N \leq 8$, with an average foil thickness DF, to be calculated as follows: $N*DF < DU \leq (N+1)*DF$.

* * * * *